US 12,556,505 B2

United States Patent
Tanzini et al.

(10) Patent No.: US 12,556,505 B2
(45) Date of Patent: Feb. 17, 2026

(54) APPARATUS METHOD FOR IMPLEMENTING AN OFFLINE NOTIFICATION DELIVERY SYSTEM VIA AN OFFLINE TRIAGE ENGINE

(71) Applicant: HYPORI, INC., Reston, VA (US)

(72) Inventors: Charles Bingham Tanzini, Raleigh, NC (US); Brian Vetter, Austin, TX (US); Michael Warner, Austin, TX (US); Mohammad Salman Dhedhi, Round Rock, TX (US); Phani Gopal Achanta, Austin, TX (US); Ryan Turner, Austin, TX (US)

(73) Assignee: HYPORI, INC., Reston, VA (US)

( * ) Notice: Subject to any disclaimer, the term of this patent is extended or adjusted under 35 U.S.C. 154(b) by 70 days.

(21) Appl. No.: 18/427,480

(22) Filed: Jan. 30, 2024

(65) Prior Publication Data

US 2025/0247354 A1     Jul. 31, 2025

(51) Int. Cl.
G06F 15/16    (2006.01)
H04L 51/224   (2022.01)
H04L 51/226   (2022.01)

(52) U.S. Cl.
CPC .......... H04L 51/224 (2022.05); H04L 51/226 (2022.05)

(58) Field of Classification Search
CPC .......................... H04L 51/224; H04L 51/226
USPC ......................................................... 709/207
See application file for complete search history.

(56) References Cited

U.S. PATENT DOCUMENTS

| 10,228,959 | B1 * | 3/2019 | Anderson | ............... G06F 9/546 |
| 2010/0042636 | A1 * | 2/2010 | Lu | ............... H04L 67/08 |
| | | | | 707/E17.044 |

* cited by examiner

Primary Examiner — Alicia Baturay
(74) Attorney, Agent, or Firm — SQUIRE PATTON BOGGS (US) LLP (57) ABSTRACT

A method for implementing an offline notification delivery system via an offline triage engine. The method is configured to store messages intended for a virtual workspace while the virtual workspace is disable, to parse messages, and to identify message priority, to facilitate the transmission of high priority messages to an appropriate recipient, and to deliver stored messages once the virtual workspace becomes enabled. The parsing and priority determination may be performed by a trained message triage machine learning algorithm. The message triage machine learning algorithm is executed by one or more processors of a computing device.

20 Claims, 4 Drawing Sheets

APPARATUS METHOD FOR IMPLEMENTING AN OFFLINE NOTIFICATION DELIVERY SYSTEM VIA AN OFFLINE TRIAGE ENGINE

BACKGROUND

1. Field

The present disclosure relates generally to an offline notification delivery system using an offline triage engine.

2. Description of the Related Art

Delivering messages to deactivated virtual machines (VMs) poses several inherent challenges. The primary issue is the inaccessibility of the VM when it is not running. Deactivated or powered-off VMs are essentially inactive segments of data on a host system, unable to perform any operations or respond to external requests. This means that any messages sent to a deactivated VM will not be received or processed in real-time. The VM's network interfaces are also inactive, making it impossible for it to maintain a presence on the network, thus rendering it unreachable through standard network communication protocols. This situation is akin to trying to call a phone that is switched off; the call cannot be connected until the phone is turned back on.

Another problem is the potential loss or delay of messages intended for the VM. In a typical setup, messages sent to a VM are managed by the host system or network infrastructure. However, without specific mechanisms in place to handle scenarios where the target VM is deactivated, these messages may be lost, rejected, or left pending indefinitely. Even if the host system queues these messages, there is no guarantee they will be delivered immediately upon the VM's reactivation. The VM might miss time-sensitive information or instructions, leading to synchronization issues, especially in environments where continuous communication and real-time data exchange are critical. Additionally, the reactivation of the VM does not necessarily mean an immediate return to its previous network state, which can further delay message delivery. There exists a need for a system to address the aforementioned issues.

SUMMARY

The following is a non-exhaustive listing of some aspects of the present techniques. These and other aspects are described in the following disclosure.

In some embodiments, a method for implementing an offline notification delivery system via an offline triage engine having a processor comprises determining if a virtual workspace (VW) is in an enabled state, wherein the virtual workspace is managed by a compute node; receiving message data from an intermediary messaging system if the virtual workspace is in a disabled state; parsing message data received from the intermediary messaging system, wherein the parsing determines a priority of the message data; generating at least one standardized notification based on the parsed message data; and sending the at least one standardized notification to an appropriate recipient if the priority is high.

In some embodiments, offline notification delivery system, comprises a offline triage engine having a processor configured to: determine if a virtual workspace (VW) is in an enabled state, wherein the virtual workspace is managed by a compute node; receive message data from an intermediary messaging system if the virtual workspace is in a disabled state; parse message data received by the intermediary messaging system, wherein the parsing determines a priority of the message data; generate at least one standardized notification based on the parsed message data; and send the at least one standardized notification to an appropriate recipient if the priority is high.

BRIEF DESCRIPTION OF THE DRAWINGS

The above-mentioned aspects and other aspects of the present techniques will be better understood when the present application is read in view of the following figures in which like numbers indicate similar or identical elements.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

Figure 1:
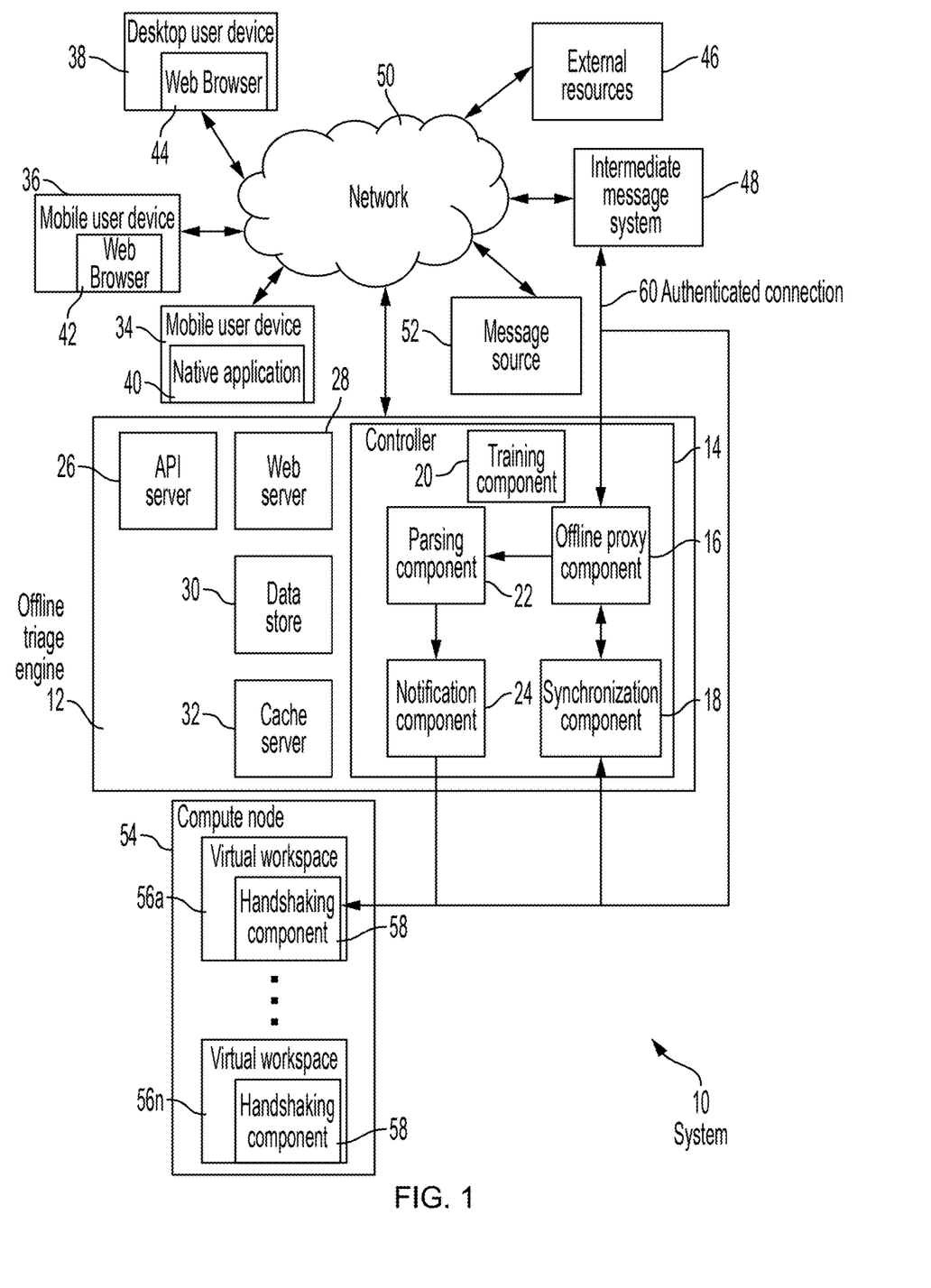
FIG. 1 is a logical-architecture block diagram that illustrates a system including an offline triage engine and other components as described herein configured for managing messages for virtual workspaces as they transition between enabled and disabled.

FIG. 1 illustrates a system 10 that enables offline triage and authenticated delivery of messages to address the above-described issues. The system 10 may enable messages that are intended to be delivered to inactive virtual machines (or virtual workspaces (VW)) to be delivered to one or more appropriate recipients (e.g., the computing hardware of a user associated with the inactive virtual workspace). In some embodiments, the appropriate recipient may be one or more user devices and system 10 may include a hardware-agnostic offline triage engine that enables delivery of virtual workspace-directed messages to any number of appropriately authenticated user devices. In some embodiments system 10 provides a means of storing messages received while the virtual workspace is inactive or disabled. The offline triage engine may take over for the virtual workspace as its proxy and listen for messages received from an intermediate message system. In some embodiments, the offline triage engine maintains a copy of the virtual workspace's authentication information which enables the offline triage engine to interact with the intermediate message system while the virtual workspace is disconnected or disabled. The offline triage engine may perform storage and/or further processing operation of the received messages whenever the virtual workspace becomes disconnected from the intermediate message system. Additionally, the stored messages may be delivered to the virtual workspace whenever a connection to the intermediate message system or the offline triage engine is reestablished. For example, when a virtual workspace is paused or turned off, a separate offline notification service takes over for the virtual workspace as its proxy and listens and may forward Firebase Cloud Messaging (FCM) messages for storage and for processing. When the virtual workspace comes back online, the pending FCM messages are delivered to the virtual workspace. System 10 may utilize additional notification systems including, APNS (Apple Push Notification Service), WNS (Windows Notification Service), pushy, Amazon SNS, and Pushengage. In some embodiments, the offline triage engine may determine the priority of the received messages and forward high priority messages to an appropriate user's physical hardware (e.g., external resources 46, desktop user devices 38, and mobile devices 34, 36 as described in greater detail hereinbelow). The offline triage engine may maintain a persistent connection with the intermediate message system to ensure message delivery regardless of the virtual workspace connection or enablement status.

System 10 utilizes information obtained from users and available message and/or notification data (e.g., protocol buffer data, authentication tokens, message content, sender information, recipient information, timestamp information, and standard notification information) to predict or otherwise determine a message's priority. For example, system 10 may be provided with the appropriate sender and recipient application information, but the message content may need to be determined. In some embodiments, the offline triage engine is designed to employ a machine learning algorithm to identify the intended recipient application and message content using the available message information, as will be described in greater detail hereinbelow. The offline triage engine may further employ the machine learning algorithm to determine a priority of the message. For example, if the machine learning algorithm determines that the message intended for a disabled virtual workspace contains information describing a massive system failure, the offline triage engine may generate a notification that alerts an administrator via a text message. Alternatively, system may identify an incoming phone call directed toward a disabled virtual workspace and alert the appropriate recipient with a notification. If system 10 doesn't have any rules for, or can't discern anything from, the notification data, embodiments may cache the message data to be forwarded when the virtual workspace is reenabled. In further embodiments, system 10 may perform a number of operations based on the available message information (e.g., forward a notification to the appropriate recipient such as a mobile device where some or all of the message content is available, determine if the received message necessitates any special handling, determine whether to start the virtual device immediately without the user connecting, combine the message with other messages and send a composite message, or simply hold it to be delivered when the virtual workspace is restarted on the next connection).

These and other benefits are described in greater detail below, after introducing the components of system 10 and describing their operation. It should be noted, however, that not all embodiments necessarily provide all of the benefits outlined herein, and some embodiments may provide all or a subset of these benefits or different benefits, as various engineering and cost tradeoffs are envisioned, which is not to imply that other descriptions are limiting.

In some embodiments, offline triage engine 12 is executed by one or more of the computers described below with reference to FIG. 4 and includes a controller 14, an application program interface (API) server 26, a web server 28, a data store 30, and a cache server 32. These components, in some embodiments, communicate with one another in order to provide the functionality of offline triage engine 12 described herein. As described in greater detail below, in some embodiments, data store 30 may store data about virtual workspaces including message information, current connection status, virtual workspace identifiers, login request values, authentication tokens, stored message data, sender and recipient information. Hardware communication preferences, training data, parsing rules, load balancing information, weights associated with different types of information, relational data, and/or other information. Available message information may include protocol buffer data, authentication tokens, message content, sender information, recipient information, timestamp information, and standard notification information.

Cache server 32 may expedite access to this data by storing likely relevant data in relatively high-speed memory, for example, in random-access memory or a solid-state drive. Web server 28 may serve webpages having graphical user interfaces that display notifications, one or more views that facilitate reviewing pending messages stored in the data store 30, one or more views that facilitate obtaining information from a user, or other displays. API server 26 may serve data to various applications that process data related to user logins, available message and/or notification information (e.g., protocol buffer data, authentication tokens, message content, sender information, recipient information, timestamp information, and standard notification information), or other data. The operation of these components 26, 28, and 30 may be coordinated by controller 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, in some embodiments, offline triage engine 12 trains an algorithm using input output training pairs that describe available prior message and/or notification information (e.g., protocol buffer data, authentication tokens, priority information, message content, sender information, recipient information, timestamp information, and standard notification information). Offline triage engine 12 receives new message information whenever a new message is received from intermediate message system 48 as input to the algorithm; and determines, with the algorithm, relational data indicative of the intended virtual workspace 56a-56n, the intended application, and the priority for the new message based on the new available message information, virtual workspace enablement status (e.g., whether virtual workspace 56a-56n is connected to intermediate message system 48 through authenticated connection 60). Offline triage engine 12 also determines, with the algorithm, based on the relational data, an appropriate format into which the message data must be translated. For example, when creating a notification after receipt of a high priority message, offline triage engine 12 maps the FCM protobuf message to a format readily understandable by the intended notification service (e.g., email, SMS, RSS), and attaches the raw protobuf data to the newly created notification.

In some embodiments, interaction with users, system administrators, and/or other entities may occur via a website or a native application viewed on a desktop computer, tablet, or a laptop of the user. In some embodiments, such interaction occurs via a mobile website viewed on a smart phone, tablet, or other mobile user device, or via a special-purpose native application executing on a smart phone, tablet, or other mobile user device. Facilitating notification services and messaging application interoperability across a variety of devices is expected to make it easier for the users and administrators to complete offline message storage, triage, and delivery when and where convenient for the user and/or the administrator.

To illustrate an example of the environment in which offline triage engine 12 operates, the illustrated embodiment of FIG. 1 includes a number of components with which offline triage engine 12 communicates: mobile user devices 34 and 36; a desk-top user device 38; and external resources 46. Each of these devices communicates with offline triage engine 12 via a network 50, such as the Internet or the Internet in combination with various other networks, like local area networks, cellular networks, Wi-Fi networks, or personal area networks.

Mobile user devices 34 and 36 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of mobile user devices 34 and 36 may store instructions that when executed by the associated processor provide an operating system and various applications, including a web browser 42 or a native mobile application 40. The desktop user device 38 may also include a web browser 44. In addition, desktop user device 38 may include a monitor; a keyboard; a mouse; memory; a processor; and a tangible, non-transitory, machine-readable memory storing instructions that when executed by the processor provide an operating system and the web browser. Native application 40 and web browsers 42 and 44, in some embodiments, are operative to provide a graphical user interface associated with a user and/or a system administrator, for example, which communicates with offline triage engine 12 and facilitates user and/or system administrator interaction with data from offline triage engine 12. Web browsers 42 and 44 may be configured to receive a website from offline triage engine 12 having data related to instructions (for example, instructions expressed in JavaScript™) that when executed by the browser (which is executed by the processor) cause mobile user device 36 and/or desktop user device 38 to communicate with offline triage engine 12 and facilitate user and/or system administrator interaction with data from offline triage engine 12. Native application 40 and web browsers 42 and 44, upon rendering a webpage and/or a graphical user interface from offline triage engine 12, may generally be referred to as client applications of offline triage engine 12, which in some embodiments may be referred to as a server. Embodiments, however, are not limited to client/server architectures, and offline triage engine 12, as illustrated, may include a variety of components other than those functioning primarily as a server. Three user devices are shown, but embodiments are expected to interface with substantially more, with more than 10,000 concurrent sessions and serving more than 1 million users distributed over a relatively large geographic area, such as a state, the entire United States, and/or multiple countries across the world.

External resources 46, in some embodiments, include sources of information such as databases, websites, etc.; external entities participating with the system 10 (e.g., systems or networks associated with message parsing and transmission), one or more servers outside of the system 10, a network (e.g., the internet), electronic storage, equipment related to Wi-Fi™ technology, equipment related to Bluetooth® technology, data entry devices, or other resources. In some implementations, some or all of the functionality attributed herein to external resources 46 may be provided by resources included in the system 10. External resources 46 may be configured to communicate with offline triage engine 12, mobile user devices 34 and 36, desk-top user device 38, and/or other components of the system 10 via wired and/or wireless connections, via a network (e.g., a local area network and/or the internet), via cellular technology, via Wi-Fi technology, and/or via other resources.

Thus, offline triage engine 12, in some embodiments, operates in the illustrated environment by communicating with a number of different devices and transmitting instructions to various devices to communicate with one another. The number of illustrated external resources 46, desktop user devices 38, and mobile user devices 36 and 34 is selected for explanatory purposes only, and embodiments are not limited to the specific number of any such devices illustrated by FIG. 1, which is not to imply that other descriptions are limiting.

Offline triage engine 12 of some embodiments includes a number of components introduced above that facilitate determination of virtual workspace connection or enablement status, message content and priority, and an appropriate notification protocol. For example, the illustrated API server 26 may be configured to communicate data about users, virtual workspace connection status, pending messages, and/or other information via a protocol, such as a representational-state-transfer (REST)-based API protocol over hypertext transfer protocol (HTTP) or other protocols. Examples of operations that may be facilitated by the API server 26 include requests to display, link, modify, add, or retrieve portions or all of user profiles, virtual workspaces 56a-56n, stored messages, protobuf rules, or other information. API requests may identify which data is to be displayed, linked, modified, added, or retrieved by specifying criteria for identifying records, such as queries for retrieving or processing information about a particular message (e.g., a message priority as described herein), for example. In some embodiments, the API server 26 communicates with the native application 40 of the mobile user device 34 or other components of system 10.

The illustrated web server 28 may be configured to display, link, modify, add, or retrieve portions or all of user profiles, virtual workspaces 56a-56n, stored messages, protobuf rules, or other information encoded in a webpage (e.g. a collection of resources to be rendered by the browser and associated plug-ins, including execution of scripts, such as JavaScript™, invoked by the webpage). In some embodiments, the graphical user interface presented by the webpage may include inputs by which the user may enter or select data, such as clickable or touchable display regions or display regions for text input. Such inputs may prompt the browser to request additional data from the web server 28 or transmit data to the web server 28, and the web server 28 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g., JavaScript™ object notation (JSON) or extensible markup language (XML). The web server 28 may communicate with web browsers, such as the web browser 42 or 44 executed by user devices 36 or 38. In some embodiments, the webpage is modified by the web server 28 based on the type of user device, e.g., with a mobile webpage having fewer and smaller images and a narrower width being presented to the mobile user device 36, and a larger, more content rich webpage being presented to the desk-top user device 38. An identifier of the type of user device, either mobile or non-mobile, for example, may be encoded in the request for the webpage by the web browser (e.g., as a user agent type in an HTTP header associated with a GET request), and the web server 28 may select the appropriate interface based on this embedded identifier, thereby providing an interface appropriately configured for the specific user device in use.

The illustrated data store 30, in some embodiments, stores data about user profiles, virtual workspaces 56a-56n, pending messages, protobuf rules, protobuf data. Data store 30 may further include record keeping functionalities that store, for example, logs of service operation, virtual workspace start/stop and/or connection/disconnection, errors/warnings, and debugging. Data store 30 may include various types of data stores, including relational or non-relational databases, document collections, hierarchical key-value pairs, or memory images, for example. Such components may be formed in a single database, document, or the like, or may be stored in separate data structures. In some embodiments, data store 30 comprises electronic storage media that electronically stores information. The electronic storage media of data store 30 may include one or both of system storage that is provided integrally (i.e., substantially non-removable) with the system 10 and/or removable storage that is removably connectable to the system 10 via, for example, a port (e.g., a USB port, a firewire port, etc.) or a drive (e.g., a disk drive, etc.). Data store 30 may be (in whole or in part) a separate component within the system 10, or data store 30 may be provided (in whole or in part) integrally with one or more other components of the system 10 (e.g., controller 14, etc.). In some embodiments, data store 30 may be located in a data center, in a server that is part of external resources 46, in a computing device 34, 36, or 38, and/or in other locations. Data store 30 may include one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), or other electronically readable storage media. Data store 30 may store software algorithms, information determined by controller 14, information received via the graphical user interface displayed on computing devices 34, 36, and/or 38, information received from external resources 46, or other information accessed by system 10 to function as described herein.

Controller 14 is configured to coordinate the operation of the other components of offline triage engine 12 to provide the functionality described herein. Controller 14 may be formed by one or more processors, for example. Controlled components may include one or more of an offline proxy component 16, a synchronization component 18, a training component 20, a parsing component 22, a notification component, and/or other components. Controller 14 may be configured to direct the operation of components 16, 18, 20, 22, and/or 24 by software; hardware; firmware; some combination of software, hardware, or firmware; or other mechanisms for configuring processing capabilities.

It should be appreciated that although components 16, 18, 20, 22, and 24 are illustrated in FIG. 1 as being co-located, one or more of components 16, 18, 20, 22, or 24 may be located remotely from the other components. The description of the functionality provided by the different components 16, 18, 20, 22, and/or 24 described below is for illustrative purposes, and is not intended to be limiting, as any of the components 16, 18, 20, 22, and/or 24 may provide more or less functionality than is described, which is not to imply that other descriptions are limiting. For example, one or more of components 16, 18, 20, 22, and/or 24 may be eliminated, and some or all of its functionality may be provided by others of the components 16, 18, 20, 22, or 24, again which is not to imply that other descriptions are limiting. As another example, controller 14 may be configured to control one or more additional components that may perform some or all of the functionality attributed below to one of the components 16, 18, 20, 22, and/or 24. In some embodiments, offline triage engine 12 (e.g., controller 14 in addition to cache server 32, web server 28, and/or API server 26) is executed in a single computing device, or in a plurality of computing devices in a datacenter, e.g., in a service oriented or micro-services architecture.

Offline proxy component 16, in some embodiments, is configured to maintain a persistent connection with intermediate message system 48 via authenticated connection 60 (e.g., a VPN). In some embodiments, mutual Transport Layer Security (mTLS) may be used as the primary factor for authenticated connection 60. Further, virtual device (e.g., virtual workspace 56a-56n) client credentials may be used to initiate the authenticated connection 60 between the virtual workspace 56a-56n and intermediate message system 48. Offline proxy component 16 may be granted a copy of the virtual device client credentials or may use its own authentication credentials to initiate authenticated connection 60 with intermediate message system 48. In addition to securing access to APIs (e.g., through API server 26), offline proxy component 16 acquires (e.g., through web server 28, data store 30, mobile user device 34 and 36, desktop user device 38, native application 40, web browser 42 and 44, external resources 46, intermediate message system 48, network 50, message source 52, compute node 54, and/or virtual workspace 56a-56n) all client certificates and credentials required for transmitting and receiving messages on behalf of virtual workspace 56a-56n.

Offline proxy component 16 may work with data store 30 to retain authentication credentials (e.g., authentication tokens, login request details, usernames, passwords, user preferences, encryption keys, and client-side persistent storage, like a cookie or a local storage objects in a browser) to ensure offline triage engine 12 is able to receive messages from intermediate message system 48 through authenticated connection 60 whenever virtual workspace 56a-56n cannot communicate with intermediate message system 48 through authenticated connection 60. The authentication credentials may identify users (which includes anonymized identifiers sufficient to distinguish one user from another, without personally identifying the user). In some embodiments, the authentication credentials include at least one of an identifying username or number, a password, an email address, or other information required to access all messages intended for virtual workspace 56a-56n and ensure offline triage engine 12 is able to receive and reroute high-priority messages as described in further detail hereinbelow. In some embodiments offline proxy component 16 supports a plurality of simultaneous authenticated connections 60 with intermediate message system 48 where each authenticated connection 60 is associated with a corresponding virtual workspace 56a-56n. For example, 10,000 unique virtual workspaces 56a-56n may be running on a single compute node 54 and offline triage engine 12 will perform offline message triage, storage and delivery to ensure no messages are lost or untimely delivered. In some embodiments, each compute node 54 may run 1-400 simultaneous virtual workspaces 56a-56n. In some embodiments, offline proxy component 16 maintains a persistent connection with intermediate message service 48 on behalf of virtual workspaces 56a-56n on a plurality of compute nodes 54.

Synchronization component 18 is configured to determine when virtual workspace 56a-56n is enabled or connected to intermediate message service 48 through authenticated connection 60 and when it is not (e.g., virtual workspace 56a-56n is disabled). For example, synchronization component 18 may actively poll virtual workspace 56a-56n to determine if authenticated connection 60 is established. Synchronization component 18 directs offline proxy component 16 to begin receiving messages for virtual workspace 56a-56n when authenticated connection 60 between virtual workspace 56a-56n and intermediate message system 48 is interrupted.

In some embodiments, synchronization component 18 monitors a lifecycle state (e.g., enabled, disabled, running, paused, stopped) of virtual workspace 56a-56n. Notice that connected/disconnected is not a lifecycle state. The enabled/disabled state does not alter any of the runtime or configuration status of virtual workspace 56a-56n. However, when disabled, a client/user cannot authenticate and cannot force the change of state of virtual workspace 56a-56n until an admin "re-enables" virtual workspace 56a-56n. There are a variety of activities or events that can trigger a change in the virtual workspace state. For example, an admin can manually stop or start an arbitrary virtual workspace 56a-56n. Similarly, an administrative script or policy could result in the arbitrary virtual workspace 56a-56n being stopped or started (for example, shutdown after 10 minutes of non-use). Configuration activities/events such as template or policy changes can result in virtual workspace 56a-56n being deallocated or reallocated. And finally, a user can also authenticate resulting in their virtual workspace 56a-56n transitioning from stopped to the running state.

In some embodiments, datastore 30 maintains a record of an up/down status (e.g., enabled or disabled) of virtual workspace 56a-56n. Synchronization component 18 may facilitate the implementation of a master/slave offline triage engine 12 configuration. For example, offline triage engine 12 may include a master controller 14 and data store 30 as well as a slave controller 14 and data store 30 where synchronization component 18 of each controller 14 enables load balancing therebetween and may enable operational redundancy if either master or slave system fails. Operational redundancy may enable all operations of offline triage engine 12 to be executed on either the master controller or the slave controller.

Training component 20 is configured to train an algorithm using input output training pairs and/or other data to parse protobuf data based on at least one of prior message information, prior priority information, prior state change information, parsing rules, and/or prior authentication information, for messages received by the intermediate message system 48, the offline triage engine 12, and/or the virtual workspace 56a-56n. In some embodiments, training component 20 is configured to cause the algorithm to learn to predict a message's priority based on at least one of prior message information, prior priority information, prior state change information, parsing rules, and/or prior authentication information, for messages received by the intermediate message system 48, the offline triage engine 12, and/or the virtual workspace 56a-56n. In some embodiments, this includes determining which algorithm inputs are predictive of message priority, determining how to combine (mathematically or otherwise) such inputs to optimize the predictive power of the algorithm, assigning a weight or percentage to different algorithm inputs, and/or other operations. For example, the training may cause the message content to be weighted heaviest, with user availability information weighted second heaviest, and specialization type information weighted third heaviest by the algorithm for the determination of the message priority. In some embodiments, future predictions of priority for pluralities of different messages may be determined based on the trained algorithm (e.g., as described below). In some embodiments, the algorithm is configured (e.g., programmed) manually by a human trainer. This configuration may be based on one or more of personal experience with the process of obtaining the documents/data sets and having gone through message triage trainings that state the relative importance of various factors (e.g., research on content, user preferences, technological limitations) for providing understanding of message triage as it relates to system 10 and priority predictions.

In some embodiments, the algorithm may comprise one or more individual algorithms. In some embodiments, an algorithm may be a machine learning algorithm. In some embodiments, the machine learning algorithm may be or include a neural network, classification tree, decision tree, support vector machine, or other model that is trained (e.g., with a stochastic gradient descent) and configured to determine message priority, perform contextual tokenization of the message content, execute offline triage operations for notification creation and delivery. As an example, neural networks may be based on a large collection of neural units (or artificial neurons). Neural networks may loosely mimic the manner in which a biological brain works (e.g., via large clusters of biological neurons connected by axons). Each neural unit of a neural network may be simulated as being connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
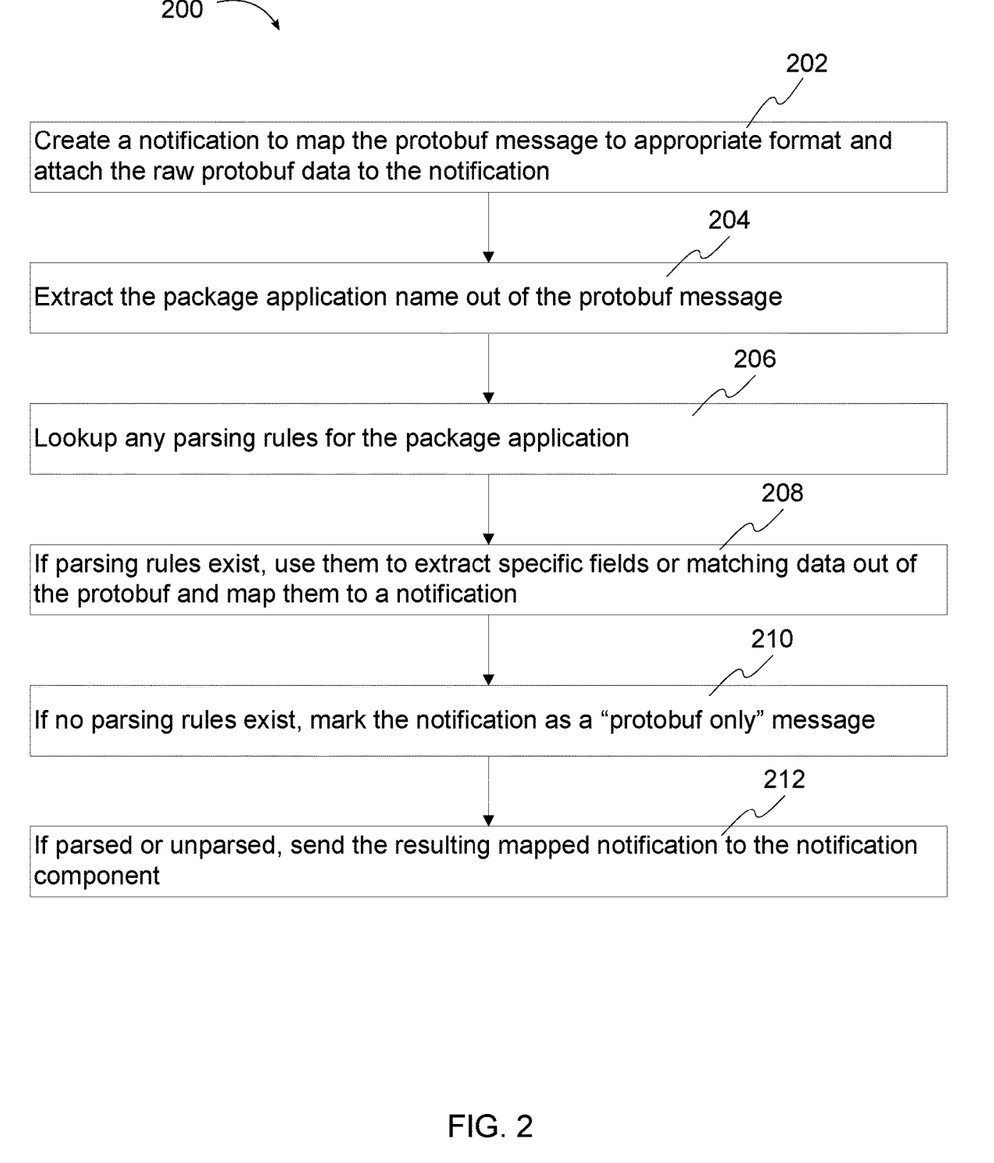
FIG. 2 is a flow chart that illustrates a process for parsing received message data within embodiments of the present system.

FIG. 2, illustrates a process 200 by which parsing component 22 is configured to identify relevant tokens within the message data received from intermediate message system 48 (FIG. 1). In some embodiments, there is no consistent formant for messages received from intermediate message system 48, so the machine learning algorithm may be trained to perform parsing operations using available message data and parsing rules retained in data store 30. Parsing process 200 may begin at 202 by creating a notification to map the protobuf message to an appropriate format and attaching the raw protobuf data to the notification with parsing component 22. The notification may be sparsely populated with standard notification information including sender, recipient, package application, and message content. Process 200 continues at 204 by extracting the package application name out of the protobuf message with parsing component 22. The package application name enables notification component 24 to correctly format and route the notification for the mapped protobuf message based on the intended recipient application (e.g., an email client, a text message client, a push notification). When the package application name or associated message content cannot be readily identified, parsing component 22 employs machine learning algorithm to parse protobuf message data (e.g., using natural language processing techniques) and determine relevant characteristics including package application name, context, priority, and triage protocol. Process 200 continues at 206 by looking up parsing rules for the package application within data store 30. Parsing rules dictate the information required to translate or map ptorobuf message data to the format required for a specific package application. Process 200 continues at 208 by employing available parsing rules to extract desired fields or matching data out of the protobuf and mapping the extracted data onto a notification. Process 200 is able to adapt to unanticipated and novel protobuf message data formats at 210 by marking notifications containing protobuf messages without identifiable parsing rules as "protobuf only" messages. 210 may include developing new parsing rules with the machine learning algorithm based on available message data (e.g., user profiles, virtual workspaces 56a-56n, prior messages, logs, pending messages, protobuf rules, package application, protobuf data). Process 200 may continue at 212 after the notification is formatted and populated, via the parsing rules and the machine learning algorithm, by sending the resulting mapped notification to notification component 24.

Returning to FIG. 1, in some embodiments, notification component 24 performs the final formatting of the notification or messages delivered to virtual workspace 56a-56n after the protobuf message data has been parsed to identify the relevant message data (e.g. contextual tokens, priority, and data relevant for formatting the notification for delivery through: web server 28, data store 30, mobile user device 34 and 36, desktop user device 38, native application 40, web browser 42 and 44, external resources 46, intermediate message system 48, network 50, message source 52, compute node 54, and/or virtual workspace 56a-56n). If the priority of the message is high, the notification engine flags the notification to be forwarded to the appropriate recipient. Notification component 24 then sends the notification to the appropriate recipient (e.g., web server 28, data store 30, mobile user device 34 and 36, desktop user device 38, native application 40, web browser 42 and 44, external resources 46, intermediate message system 48, network 50, message source 52, compute node 54, and/or virtual workspace 56a-56n). For example, in order for notification component 24 to act on behalf of virtual workspaces 56a-56n, the virtual workspace must provide it with its FCM authentication token and FCM login request details before being able to establish a connection and login to Google mtalk servers. In some embodiments, offline triage engine 12 may include a feature to check in with the mtalk servers in order to get a new FCM authentication token. For example, API server may interact with Google messaging through mtalk servers. These APIs may be used by Android devices to communicate with the Google FCM servers. In this exemplary case, notification component 24 identifies and employs a number of protocols required to transmit messages related to virtual workspace 56a-56n using these APIs. In further embodiments, the APIs used to interact with virtual workspace 56a-56n and proprietary services may be REST API services provided by the FCM proxy (e.g., intermediate message system 48). The REST API services may facilitate the translation of notifications from notification component 24 to a translation or handshaking component 58 of the appropriate recipient or an alternative active virtual workspace 56a-56n. For example, virtual workspace 56a-56n may implement Google Play Services or microG to deliver notifications to Android applications. Notifications that are not delivered to the appropriate recipient while virtual workspace 56a-56n is disabled are delivered to virtual workspace 56a-56n once reenabled and authenticated connection 60 to intermediate message system 48 is reestablished.

In some embodiments a record component is configured to create a record of the prediction of the message priority, and/or other information. In some embodiments, the record is stored in data store 30 or other storage locations. In some embodiments, the record is incorporated into the available message data. In some embodiments, the record component is configured to receive, and provide to the algorithm, later priority prediction and triage protocols. The record component is configured to iteratively update, based on the later priority prediction and triage protocols, the training of the algorithm, such that the determining of the priority prediction and triage protocols is automatically personalized for the international virtual workspace 56a-56n over time.

With the iterative updating, the algorithm (e.g., a machine learning model) may suffer from false positives or false negatives during self-training—e.g., it may increase the importance of a wrong factor in the algorithm if too many users experience it at once; it may be an outlier case. To avoid this, the algorithm may be configured to run four simultaneous instances of the algorithm (though only one may be presented to the user). There may be a "base case" model, for example, which is the core of a score and a direct result of human training and have equally weighted positive and negative effects to the score/model. There may be an "upper case" and a "lower case" model that have different levels of impact on a score where a fault is determined. "Upper case" may have more impactful positive adjustments and less impactful negative adjustments to a score whereas "lower case" may have the reverse. The fourth instance may be an "initial case" which is a version of a score that may run the algorithm as if it never trained itself.

It should be noted that in some embodiments, offline triage engine 12 may be configured such that in the above mentioned operations of controller 14, input from users and/or sources of information inside or outside system 10 may be processed by controller 14 through a variety of formats, including clicks, touches, uploads, downloads, etc. The illustrated components (e.g., controller 14, API server 26, web server 28, data store 30, and cache server 32) of offline triage engine 12 are depicted as discrete functional blocks, but embodiments are not limited to systems in which the functionality described herein is organized as illustrated by FIG. 1. The functionality provided by each of the components of offline triage engine 12 may be provided by software or hardware modules that are differently organized than is presently depicted, for example such software or hardware may be intermingled, broken up, distributed (e.g., within a data center or geographically), or otherwise differently organized. The functionality described herein may be provided by one or more processors of one or more computers executing code stored on a tangible, non-transitory, machine readable medium.

Figure 3:
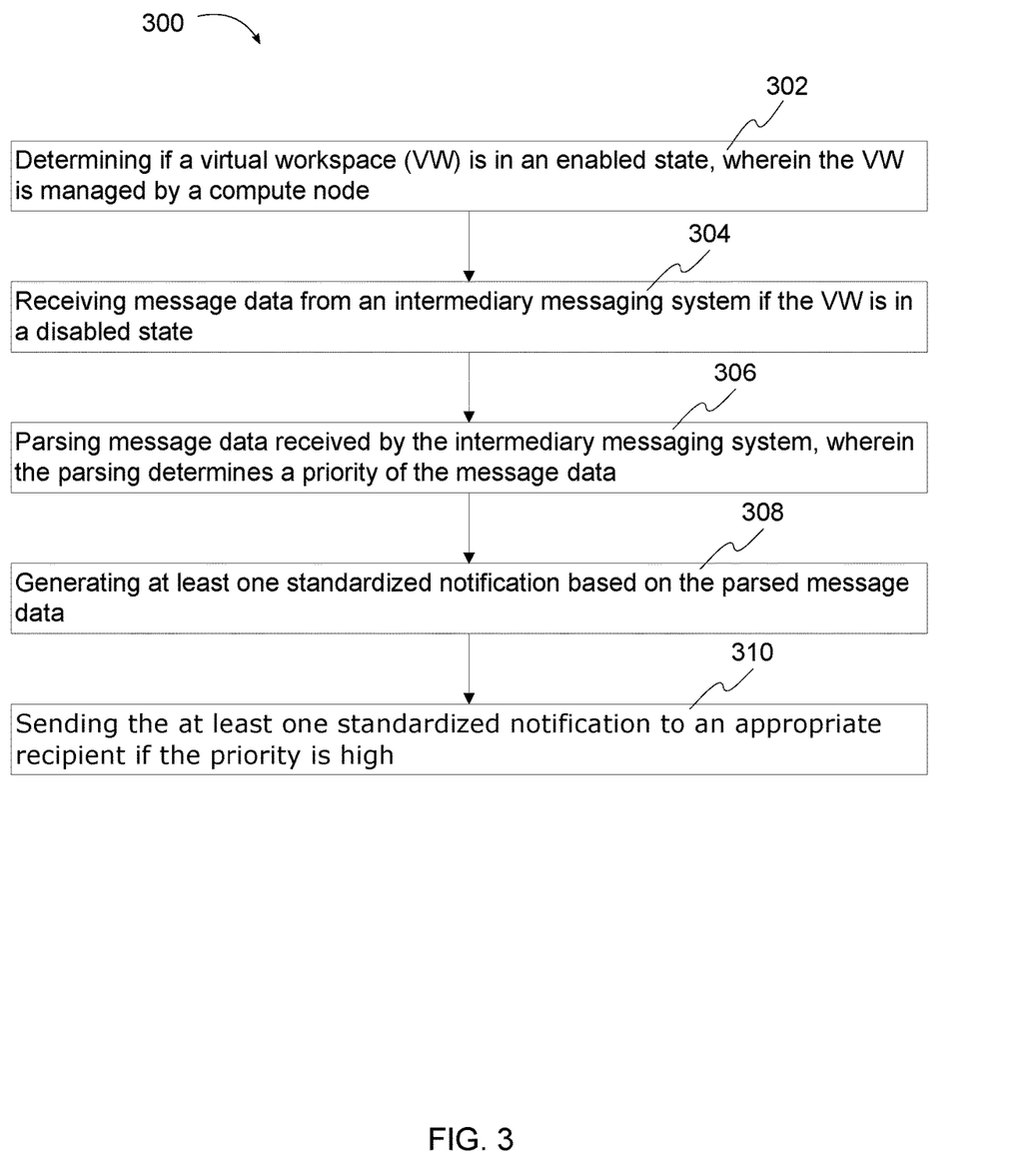
FIG. 3 is a flow chart that illustrates a process for managing received messages for virtual workspaces that transition between the enabled and disabled states within embodiments of the present system.

FIG. 3 is a flowchart of a method 300 for implementing an offline notification delivery system via a triage server (e.g., offline triage engine 12) within some embodiments of system 10 (FIG. 1) discussed above. In the embodiment associated with FIG. 3, method 300 begins at 302 by determining, with synchronization component 18, if virtual workspace 56a-56n is in an enabled state. Virtual workspace 56a-56n may be managed by compute node 54. Method 300 continues at 304 by receiving, with intermediary proxy component 16, message data from intermediate message system 48 if virtual workspace 56a-56n is in a disabled state. As described above, synchronization component 18 notifies offline proxy component 16 to begin receiving messages intended for virtual workspace 56a-56n whenever virtual workspace 56a-56n becomes disconnected or otherwise unavailable. Method 300 continues at 306 by parsing, with parsing component 22, message data received from intermediate message system 48, wherein the parsing determines a priority of the message data. The priority may indicate a rating of importance to the intended recipient, as determined by the algorithm and the parsing rules. The method continues at 308 by generating, with notification component 24, at least one standardized notification based on the parsed message data. The standardized notification may be a sparsely populated notification format that includes sufficient information to store, process, and transmit the message without significant loss of data fidelity. As described above, the notification may be standardized based on parsing rules, algorithmic analysis, and/or user preference. Method 300 continues at 310 by sending, with notification component 24, the at least one standardized notification to the appropriate recipient if the priority is high. Further, different message triage operations may be executed depending on the message priority. For example, system 10 may send notifications about high priority messages to an administrator via text, send medium priority messages via email, and keep low priority messages in the data store 30 until the virtual workspace 56a-56n is enabled. In some embodiments, the appropriate recipient may be selected from a list of individuals based on a plurality of characteristics (e.g., employee position, workplace seniority, shift assignments, availability, proximity to issue, expertise, available resources). Further, the authorized recipient may refer to a plurality of recipients that are notified in a group chat that facilitates problem remediation and/or collaboration. Notifications may be sent to emergency response personnel or third-party service providers depending on the parsing. In some embodiments, method 300 and process 200 are implemented by components of system 10 (e.g., offline triage engine 12, virtual machines 56a-56n) and computer system 400 (FIG. 1 and FIG. 4).

Referring to FIG. 1 and FIG. 3, in some embodiments, virtual workspace 56a-56n is disconnected from the intermediate message system 48 while in the disabled state (FIG. 1). As described above, method 300 may further include establishing an authorized connection (e.g., authenticated connection 60) with the intermediate message system 48 and capturing message data when the virtual workspace 56a-56n is in the disabled state. Method 300 may further include transferring the at least one standardized notification generated from the captured message data to virtual workspace 56a-56n when virtual workspace 56a-56n is in the enabled state. Method 300 may further include monitoring, with synchronization engine 18, a state of a connection between virtual workspace 56a-56n and intermediate message system 48; and initializing a message rerouting process if virtual workspace 56a-56n transitions into the disabled state, wherein the triage server (e.g., offline triage engine 12 in FIG. 1) functions as a proxy for virtual workspace 56a-56n during the message rerouting process (FIG. 1). Method 300 may include a machine learning model to dynamically analyze message data and generate contextual tokens for each message included in the message data. In some embodiments, the contextual tokens include at least one of message priority, message content, sender information, authentication information, and application information.

In some embodiments, virtual workspace 56a-56n is managed by compute node 54 which has a processor (e.g., processor 410 in FIG. 4) configured for establishing an authorized connection (e.g., authenticated connection 60 in FIG. 1) between intermediate message system 48 and offline triage engine 12. Processor 410 may further be configured for receiving the at least one standardized notification from the notification component 24 through authenticated connection 60 as described hereinabove. Processor 410 may further be configured to translate the message data and the at least one standardized notification into a plurality of application-specific notifications that will be distributed among the appropriate applications managed by compute node 54. In some embodiments, establishing authorized connection 60 includes sending authentication data, and the authentication data includes at least one of user data, an authentication token, a device ID, and login request details. In some embodiments, a backup server runs in parallel with offline triage engine 12 and the backup server replaces offline triage engine 12 if offline triage engine 12 becomes disabled.

Figure 4:
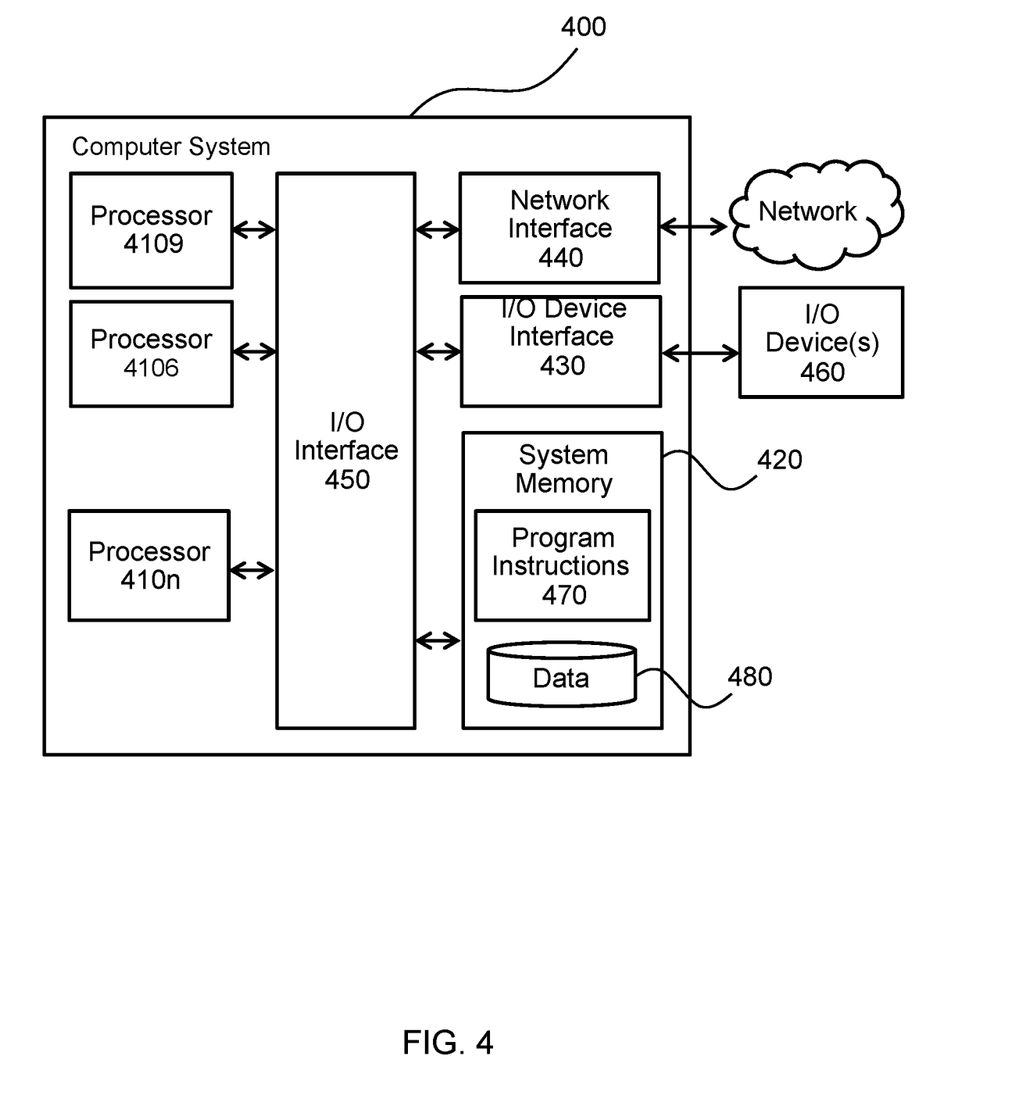
FIG. 4 is a diagram that illustrates an exemplary computing system in accordance with embodiments of the present system.

FIG. 4 is a diagram that illustrates an exemplary computer system 400 in accordance with embodiments of the present system. Various portions of systems and methods described herein may include or be executed on one or more computer systems the same as or similar to computer system 400. For example, offline triage engine 12, mobile user device 34, mobile user device 36, desktop user device 38, external resources 46, compute node 54, and/or other components of the system 10 (FIG. 1) may be and/or include one more computer systems the same as or similar to computer system 400. Further, processes, modules, processor components, and/or other components of system 10 described herein may be executed by one or more processing systems similar to and/or the same as that of computer system 400.

Computer system 400 may include one or more processors (e.g., processors 410a-410n) coupled to system memory 420, an input/output I/O device interface 430, and a network interface 440 via an I/O interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computer system 400 may be a uni-processor system including one processor (e.g., processor 410a), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 400 may include a plurality of computing devices (e.g., distributed computer systems) to implement various processing functions.

I/O device interface 430 may provide an interface for connection of one or more I/O devices 460 to computer system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computer system 400 through a wired or wireless connection. I/O devices 460 may be connected to computer system 400 from a remote location. I/O devices 460 located on a remote computer system, for example, may be connected to computer system 400 via a network and network interface 440.

Network interface 440 may include a network adapter that provides for connection of computer system 400 to a network. Network interface 440 may facilitate data exchange between computer system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 470 or data 480. Program instructions 470 may be executable by a processor (e.g., one or more of processors 410a-410n) to implement one or more embodiments of the present techniques. Instructions 470 may include modules and/or components (e.g., components 16-24 shown in FIG. 1) of computer program instructions for implementing one or more techniques described herein with regard to various processing modules and/or components. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 400 or multiple computer systems 400 configured to host different portions or instances of embodiments. Multiple computer systems 400 may provide for parallel or sequential processing/execution of one or more portions of the techniques described herein.

Those skilled in the art will appreciate that computer system 400 is merely illustrative and is not intended to limit the scope of the techniques described herein. Computer system 400 may include any combination of devices or software that may perform or otherwise provide for the performance of the techniques described herein. For example, computer system 400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a television or device connected to a television (e.g., Apple TV™), or a Global Positioning System (GPS), or the like. Computer system 400 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method for implementing an offline notification delivery system via an offline triage engine having a processor, the method comprising: determining if a virtual workspace (VW) is in an enabled state, wherein the virtual workspace is managed by a compute node; receiving message data from an intermediary messaging system if the virtual workspace is in a disabled state; parsing message data received from the intermediary messaging system, wherein the parsing determines a priority of the message data; generating at least one standardized notification based on the parsed message data; and sending the at least one standardized notification to the appropriate recipient if the priority is high.

2. The method of claim 1, wherein the virtual workspace is connected to the intermediary messaging system while in the enabled state, and wherein the virtual workspace is disconnected from the intermediary messaging system while in the disabled state.

3. The method of claim 1, further comprising: establishing an authorized connection with the intermediary messaging system; and capturing message data when the virtual workspace is in the disabled state.

4. The method of claim 3, further comprising transferring the at least one standardized notification generated from the captured message data to the virtual workspace when the virtual workspace is in the enabled state.

5. The method of embodiment 1, further comprising: monitoring a state of a connection between the virtual workspace and the intermediary messaging system; and initializing a message rerouting process if the virtual workspace transitions into the disabled state, wherein the offline triage engine functions as a proxy for the virtual workspace during the message rerouting process.

6. The method of embodiment 1, wherein parsing the message data includes analyzing message data to generate contextual tokens for each message included in the message data, and wherein the contextual tokens include at least one of message priority, message content, sender information, authentication information, and application information.

7. The method of embodiment 6, wherein the parsing includes a machine learning model to dynamically identify contextual tokens.

8. The method of embodiment 1, wherein the virtual workspace is managed by the compute node having a processor configured for: establishing an authorized connection with the intermediary messaging system and the offline triage engine; receiving message data from the intermediary messaging system; receiving the at least one standardized notification from the offline triage engine; translating the message data and the at least one standardized notification into a plurality of application-specific notifications; and distributing each of the plurality of application-specific notifications to a corresponding application from a plurality of applications managed by the compute node.

9. The method of embodiment 8, wherein establishing an authorized connection includes sending authentication data, and wherein the authentication data includes at least one of user data, an authentication token, a device ID, and login request details.

10. The method of embodiment 1, wherein a backup server runs in parallel with the offline triage engine and wherein the backup server replaces the offline triage engine if the offline triage engine becomes disabled.

11. An offline notification delivery system, comprising: an offline triage engine having a processor configured to: determine if a virtual workspace (VW) is in an enabled state, wherein the virtual workspace is managed by a compute node; receive message data from an intermediary messaging system if the virtual workspace is in a disabled state; parse message data received by the intermediary messaging system, wherein the parsing determines a priority of the message data; generate at least one standardized notification based on the parsed message data; and send the at least one standardized notification to an appropriate recipient if the priority is high.

12. The system of embodiment 11, wherein the virtual workspace is connected to the intermediary messaging system while in the enabled state, and wherein the virtual workspace is disconnected from the intermediary messaging system while in the disabled state.

13. The system of embodiment 11, wherein the processor is further configured to:
establishing an authorized connection with the intermediary messaging system; and capture message data when the virtual workspace is in the disabled state.

14. The system of embodiment 13, wherein the processor is further configured to transfer the at least one standardized notification generated from the captured message data to the virtual workspace when the virtual workspace is in the enabled state.

15. The system of embodiment 11, wherein the processor is further configured to: monitor a state of a connection between the virtual workspace and the intermediary messaging system; and initialize a message rerouting process if the virtual workspace transitions into the disabled state, wherein the offline triage engine functions as a proxy for the virtual workspace during the message rerouting process.

16. The system of embodiment 11, wherein parsing the message data includes analyzing message data to generate contextual tokens for each message included in the message data, and wherein the contextual tokens include at least one of message priority, message content, sender information, authentication information, and application information.

17. The system of embodiment 16, wherein the parsing includes a machine learning model to dynamically identify contextual tokens.

18. The system of embodiment 11, wherein the virtual workspace is managed by the compute node having a processor configured to: establish an authorized connection with the intermediary messaging system and the offline triage engine; receive message data from the intermediary messaging system; receive the at least one standardized notification from the offline triage engine; translate the message data and the at least one standardized notification into a plurality of application-specific notifications; and distribute each of the plurality of application-specific notifications to a corresponding application from a plurality of applications managed by the compute node.

19. The system of embodiment 18, wherein establishing an authorized connection includes sending authentication data, and wherein the authentication data includes at least one of user data, an authentication token, a device ID, and login request details.

20. The system of embodiment 11, wherein a backup server runs in parallel with the offline triage engine and wherein the backup server replaces the offline triage engine if the offline triage engine becomes disabled.

What is claimed is:

1. A method for implementing an offline notification delivery system via an offline triage engine having a processor, the method comprising:
   determining if a virtual workspace (VW) is in an enabled state, wherein the virtual workspace is managed by a compute node;
   receiving message data from an intermediary messaging system if the virtual workspace is in a disabled state;
   parsing message data received from the intermediary messaging system, wherein the parsing determines a priority of the message data;
   generating at least one standardized notification based on the parsed message data; and
   sending the at least one standardized notification to an appropriate recipient if the priority is high.

2. The method of claim 1, wherein the virtual workspace is connected to the intermediary messaging system while in the enabled state, and wherein the virtual workspace is disconnected from the intermediary messaging system while in the disabled state.

3. The method of claim 1, further comprising:
   establishing an authorized connection with the intermediary messaging system; and
   capturing message data when the virtual workspace is in the disabled state.

4. The method of claim 3, further comprising transferring the at least one standardized notification generated from the captured message data to the virtual workspace when the virtual workspace is in the enabled state.

5. The method of claim 1, further comprising:
   monitoring a state of a connection between the virtual workspace and the intermediary messaging system; and
   initializing a message rerouting process if the virtual workspace transitions into the disabled state, wherein the offline triage engine functions as a proxy for the virtual workspace during the message rerouting process.

6. The method of claim 1, wherein parsing the message data includes analyzing message data to generate contextual tokens for each message included in the message data, and wherein the contextual tokens include at least one of message priority, message content, sender information, authentication information, and application information.

7. The method of claim 6, wherein the parsing includes a machine learning model to dynamically identify contextual tokens.

8. The method of claim 1, wherein the virtual workspace is managed by the compute node having a processor configured for:
   establishing an authorized connection with the intermediary messaging system and the offline triage engine;
   receiving message data from the intermediary messaging system;
   receiving the at least one standardized notification from the offline triage engine;
   translating the message data and the at least one standardized notification into a plurality of application-specific notifications; and
   distributing each of the plurality of application-specific notifications to a corresponding application from a plurality of applications managed by the compute node.

9. The method of claim 8, wherein establishing an authorized connection includes sending authentication data, and wherein the authentication data includes at least one of user data, an authentication token, a device ID, and login request details.

10. The method of claim 1, wherein a backup server runs in parallel with the offline triage engine and wherein the backup server replaces the offline triage engine if the offline triage engine becomes disabled.

11. An offline notification delivery system, comprising:
    an offline triage engine having a processor configured to:
    determine if a virtual workspace (VW) is in an enabled state, wherein the virtual workspace is managed by a compute node;
    receive message data from an intermediary messaging system if the virtual workspace is in a disabled state;
    parse message data received by the intermediary messaging system, wherein the parsing determines a priority of the message data;
    generate at least one standardized notification based on the parsed message data; and
    send the at least one standardized notification to an appropriate recipient if the priority is high.

12. The system of claim 11, wherein the virtual workspace is connected to the intermediary messaging system while in the enabled state, and wherein the virtual workspace is disconnected from the intermediary messaging system while in the disabled state.

13. The system of claim 11, wherein the processor is further configured to:
    establishing an authorized connection with the intermediary messaging system; and
    capture message data when the virtual workspace is in the disabled state.

14. The system of claim 13, wherein the processor is further configured to transfer the at least one standardized notification generated from the captured message data to the virtual workspace when the virtual workspace is in the enabled state.

15. The system of claim 11, wherein the processor is further configured to:
   monitor a state of a connection between the virtual workspace and the intermediary messaging system; and
   initialize a message rerouting process if the virtual workspace transitions into the disabled state, wherein the offline triage engine functions as a proxy for the virtual workspace during the message rerouting process.

16. The system of claim 11, wherein parsing the message data includes analyzing message data to generate contextual tokens for each message included in the message data, and wherein the contextual tokens include at least one of message priority, message content, sender information, authentication information, and application information.

17. The system of claim 16, wherein the parsing includes a machine learning model to dynamically identify contextual tokens.

18. The system of claim 11, wherein the virtual workspace is managed by the compute node having a processor configured to:
   establish an authorized connection with the intermediary messaging system and the offline triage engine;
   receive message data from the intermediary messaging system;
   receive the at least one standardized notification from the offline triage engine;
   translate the message data and the at least one standardized notification into a plurality of application-specific notifications; and
   distribute each of the plurality of application-specific notifications to a corresponding application from a plurality of applications managed by the compute node.

19. The system of claim 18, wherein establishing an authorized connection includes sending authentication data, and wherein the authentication data includes at least one of user data, an authentication token, a device ID, and login request details.

20. The system of claim 11, wherein a backup server runs in parallel with the offline triage engine and wherein the backup server replaces the offline triage engine if the offline triage engine becomes disabled.

* * * * *